Dec. 10, 1963     R. W. KOLB     3,113,886
WATER APPLYING METHOD AND APPARATUS FOR
TIRE CORD FABRIC MANUFACTURE
Filed March 17, 1961
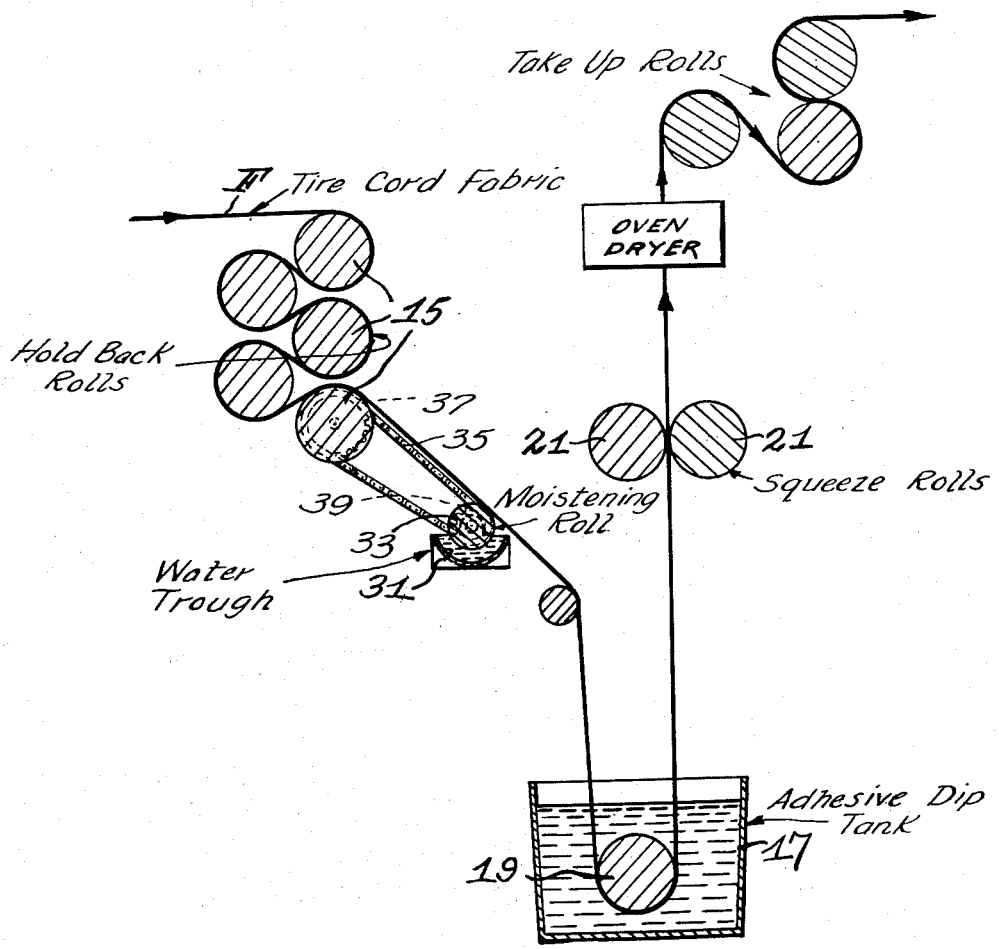
Inventor
Robert. W. KOLB
By
Attorney 3,113,886
WATER APPLYING METHOD AND APPARATUS FOR TIRE CORD FABRIC MANUFACTURE
Robert W. Kolb, Drummondville, Quebec, Canada, assignor to Dominion Textile Company Limited, Montreal, Quebec, Canada
Filed Mar. 17, 1961, Ser. No. 96,605
Claims priority, application Canada Dec. 24, 1960
7 Claims. (Cl. 117—47)

This invention relates to the manufacture of tire cord fabric.

Pneumatic tires are conventionally composed of several layers of tire cords in addition to rubber, whose function it is to offer the necessary resistance to loads borne by the tires. These cords must be properly positioned. One way of making the fabric is by weaving the cords as the warp with a minimum number of picks per inch of a light weft yarn effective to permit the control of the cords during processing. Another way of making the fabric is by properly positioning the cords during the calendering operation, in which a film of rubber is applied to the "sheet" of cords, providing sufficient holding power to maintain their proper position.

Both types of fabric are processed by applying, before the rubber is applied, a suitable adhesive having the properties of bonding itself to the cord as well as to the surrounding rubber of the tire. This adhesive is applied conventionally in the form of a dip solution into which the fabric is dipped.

One of the problems in dipping is to prevent penetration of dip into the cords, to a degree beyond that necessary for adequate bonding. An attempt to overcome this problem has been made by wetting the cords with water, removing the excess, then dipping the cords in the adhesive and subsequently drying the fabric. This is accomplished by passing the cord through auxiliary apparatus which includes a water tank or trough, the fabric being held beneath the water level by passing about a roll submerged in the tank. Following the water tank are squeeze rolls for removing excess water from the fabric prior to application of the latex adhesive.

A disadvantage of this procedure is that the cord is so thoroughly wetted that it is difficult to remove the excess completely and there is nearly always more water in the fabric than necessary at the time it is immersed in the dip solution. This excess causes gradual dilution of the dip solution as well as inhibiting the bond of the adhesive to the fabric.

*The Applicant's Development*

The present invention provides for moistening a synthetic non-bibulous fabric having a multiplicity of strong warp cords in parallel relationship with at most weak basting threads as weft by applying water to the fabric in an amount effective to reduce penetration of the adhesive without inhibiting its bond to the cord surface, at the same time, avoiding any excess which would dilute the dip solution. This amount is not more than the maximum required to fill voids or spaces within the cord that is, the interstices between the filaments thereof, a suitable range being from about 3% to about 9% by weight of the fabric. The fabric, before water application, may contain hygroscopic water, especially in the case of nylon, rayon, or cotton.

A preferred way of applying the water is by the use of a moistening roll whose surface speed is so related to that of the fabric that the fabric always takes up only the required amount of water. The moisture roll and fabric speeds remain at all times in constant relationship through a drive mechanism driving the moistening roll by gears or chains in synchronism with any other roll in the dipping apparatus which moves at the same surface speed as the fabric.

The invention has been generally described and it will now be referred to in more detail by reference to the accompanying drawing which illustrates a preferred apparatus for carrying it out.

In the drawing, a tire cord fabric F is shown passing around hold-back rolls 15, to the dip tank 17. The fabric F may be made up of many parallel cords not held together by woven cross threads or held together by light weft threads spaced apart at suitable intervals as is well understood in the tire cord art. In the dip tank the fabric is immersed in the dip solution by passing beneath the immersion roll 19. The fabric then leaves the dip solution and passes between a pair of squeeze rolls 21 and thence to the drying oven and to a set of take-up rolls similar to the hold-back rolls 15. The hold-back rolls and the take-up rolls exert required tension on the fabric while a given section of fabric is between these two sets of rolls, i.e. during immersion in the dip solution and during drying.

Up to this point the apparatus described is conventional.

In accordance with this preferred form of the invention, the applicant provides a water trough 31 in which there rotates a driven roll 33 driven in synchrony with the rolls which control the fabric speed. This may be accomplished, for example, by a chain 35 which engages a sprocket 37 connected to the lowermost roll 15 and a sprocket 39 connected to the moistening roll 33. The trough 31 is equipped so that an automatic supply of water is assured and maintained at a constant level. The moistening roll 33 is so mounted that it is partly immersed in the water and is such that its upper surface contacts the full width of the fabric.

The moistening roll may be a smooth surfaced metal cylinder of any convenient diameter, positively driven at a suitably speed of rotation. When the moistening roll 33 rotates in contact with the water in the trough its upper surface will be constantly wet. The fabric F in contact with the wet roll surface will absorb most of the water presented to it in this way.

By varying the speed of rotation of the moistening roll in relation to the speed of the fabric passing over it, the amount of water presented to the fabric may be varied. Greater amounts of water may be presented to the fabric by increasing the surface speed of the moistening roll in relation to the speed of the fabric passing over it. Lesser amounts of water may be presented to the fabric by decreasing the surface speed of the moistening roll in relation to the speed of the fabric passing over it.

In any given arrangement of roll diameter, depth of roll in the water of the trough, type of roll surface, etc., a certain speed relationship exists under which any desired amount of water may be presented to a unit length of fabric. As long as less water is presented to the fabric than the latter can absorb, the amount of water actually absorbed by the fabric will vary directly with the amount of water presented to it in this way.

The degree of immersion of the treating roll in the water trough is not important, beyond the simple and obvious need for this roll to at least contact the water in the trough, so that the roll surface bears a film of water across its full working surface continuously. There are many similar details such as water temperature, water hardness, presence of and type and concentration of wetting agents, roll surface material, actual fabric and/or roll speeds, roll diameter, all of which are unimportant in themselves, since the fabric moistening can, in any event, be increased or decreased by increasing or decreasing the moistening roll speed relative to the speed of the fabric, thus permitting any desired degree of wetting by determination, through trials, of the correct speed relationship for any given installation. Perhaps it would help to prove the point to mention two obvious examples of what is involved.

Hygroscopic moisture is normally present in most textile fibres in amounts that vary according to the substance comprising the fibre and any chemical finishing matter that may be present and according to the prevailing relative humidity and temperature of the atmosphere to which the material is exposed. Nylon, for example, contains from, roughly, 2% to 6% moisture regain depending upon whether it is in equilibrium with very dry atmosphere or one of high relative humidity at normal room temperatures.

This aspect should be considered in adjusting the pre-moistening apparatus of the present invention to provide the desired additional moisture pick-up. The percentages by weight of water mentioned elsewhere in this application refer to the water added as described. A feature of the apparatus is that any desired amount of moisture can be added by proper adjustment of the speed of the moistening roll relative to the speed of the fabric contacting it, within the limits cited.

The water pick-up may be estimated by known methods. The chief concern is not actually with how much water is picked up but rather with whether the final cord has excess dip penetration or not (as seen by microscopic examination of cord cross-sections), the moistening roll speed adjustments can be made on the basis of cord cross-sections plus test results to indicate whether or not the dip solution is being diluted by any given speed. Also by comparing test data on fabric of dip solution or dip solids picked up normally (without the moistening roll) with corresponding test results on fabric dipped with an active moistening roll, a calculation can be made of how much water must have been picked up from the moistening roll.

The invention is particularly applicable to synthetic fibres which are essentially non-bibulous, that is, do not absorb water in the same sense as cotton. Suitable tire cord fibres are nylon and polyesters, for example those sold under the trademarks "Terylene" and "Dacron." The invention actually applies to any tire fabric material in which dip penetration into the free spaces between filaments occurs and is undesirable. This does not normally occur on rayon because the nature of this material is such that the outer filaments, which are the first to be touched by the aqueous dip, swell and so insulate the inner filaments against penetration. It is conceivable that rayon cord could contain a very hydrophobic finish such that it would then behave in a non-bibulous way, that then dip penetration problems could arise, to which the present invention could apply. Thus the material characteristic with which the present invention is concerned is its tendency to be penetrated undesirably by dip solutions.

To give an even more specific idea of practical apparatus, the following example is given, but not in a limiting sense.

*Example*

A four-inch diameter steel roll was employed as the roll 33. It rotated at a surface speed of 35% to 40% of the speed of the fabric passing over it. It was immersed to a depth of approximately 0.5 inch in the water in the trough 31. Fabric speeds of 10 to 50 yards a minute were found to be satisfactory to provide a moisture pick-up of the fabric of 4% to 5% by weight.

The fabric was conventional 840 denier 2 ply nylon tire fabric.

The water was Drummondville tap water and contained about 1% of a common wetting agent—100% nonyl phenoxy polyoxyethylene ethanol (Igepal CO-630).

In a typical run, nylon fabric of 1900 cords each 840/2 were dipped at 30 yards per minute in a 20% total solution of resorcinol-formaldehyde latex adhesive solution, preceded by contact with the moistening roll which was rotated at 34 revolutions per minute.

I claim:

1. A method of making a fabric reinforcing for rubber articles, the steps of providing a synthetic non-bibulous fabric having a multiplicity of strong warp cords in parallel relationship with at most weak basting threads as weft, moistening the fabric by applying to it uniformly at most sufficient water to fill the interstices within the cords, and without removing any of the water, applying a rubber-to-fabric latex adhesive to the fabric while it contains said moistening water, and drying the fabric.

2. A method, as defined in claim 1, in which the cords are of a synthetic linear polymer.

3. A method, as defined in claim 1, in which the amount of water applied is within the range from about 3% to about 9% by weight of the dry fabric.

4. A method, as defined in claim 1, in which the amount of adhesive solid applied is within the range from about 2% to about 8% by weight of the dry fabric weight.

5. A method, as defined in claim 1, in which the water is applied by passing the fabric into contact with the surface of a moistened roll running at a speed synchronized with that of the fabric.

6. A method, as defined in claim 1, in which the amount of water applied is within the range from about 3% to about 9% by weight of the dry fabric and the amount of adhesive solid applied is within the range from about 2% to about 8% by weight of the dry fabric.

7. An apparatus for applying adhesive to synthetic non-bibulous tire cord fabric, comprising in combination, respective means for feeding and taking up the fabric and keeping a given length under tension, and intermediate said respective means a dip tank through which the fabric is passed to apply the adhesive, and in advance of the dip tank a moistening roll in contact with the fabric, and means for driving said moistening roll at a surface speed synchronized with that of the fabric feeding means to apply an amount of water at most sufficient to fill the interstices within the cords comprising the fabric.

References Cited in the file of this patent

UNITED STATES PATENTS

| | | |
|---|---|---|
| 1,989,036 | Bradner | Jan. 22, 1935 |
| 2,898,664 | Salem | Aug. 11, 1959 |
| 3,050,820 | Pamm | Aug. 28, 1962 |